No. 870,018. PATENTED NOV. 5, 1907.
J. J. COSGROVE.
WATER CLOSET CONNECTION.
APPLICATION FILED OCT. 25, 1906.

WITNESSES:                    INVENTOR
                              Joseph J. Cosgrove
                         BY
                              Connolly Bros.
                                    Attorneys

UNITED STATES PATENT OFFICE.

JOSEPH J. COSGROVE, OF SCRANTON, PENNSYLVANIA, ASSIGNOR TO STANDARD SANITARY MANUFACTURING COMPANY, OF PITTSBURG, PENNSYLVANIA, A CORPORATION OF NEW JERSEY.

WATER-CLOSET CONNECTION.

No. 870,018.  Specification of Letters Patent.  Patented Nov. 5, 1907.

Application filed October 25, 1906. Serial No. 340,544.

*To all whom it may concern:*

Be it known that I, JOSEPH J. COSGROVE, a citizen of the United States, residing at Scranton, in the county of Lackawanna and State of Pennsylvania, have invented certain new and useful Improvements in Water-Closet Connections, of which the following is a specification.

This invention has relation to soil pipe connections for metallic water closets, and has for its object the provision of a novel all-metallic connection between the outlet passage of a metallic water closet and a soil pipe.

The joint between the outlet passage of a metallic closet and the soil pipe is usually effected by means of flexible washers or by using cement or putty, but such joints are liable to become leaky by the decay or disintegration of the material used to make the joint packing.

In carrying my present invention into effect I provide the outlet passage of the closet and a bell carried by the end of the soil pipe each with a concave seat, and I locate between the two an inner thimble which is rounded or convex on its external surface and which fits in the concave seats in the outlet passage and the bell on the end of the soil pipe respectively.

Figure 1:
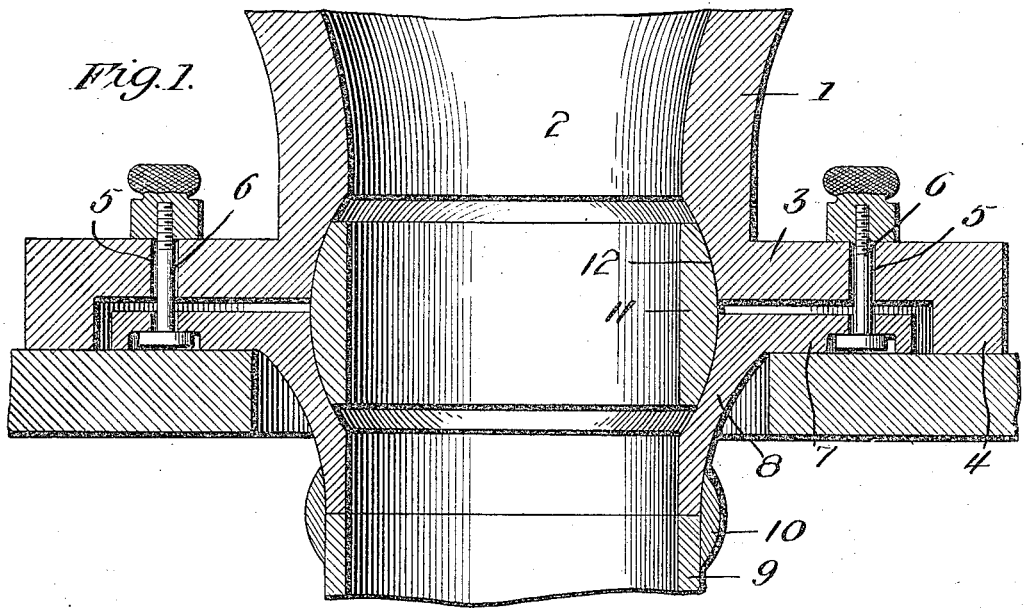
Figure 2:
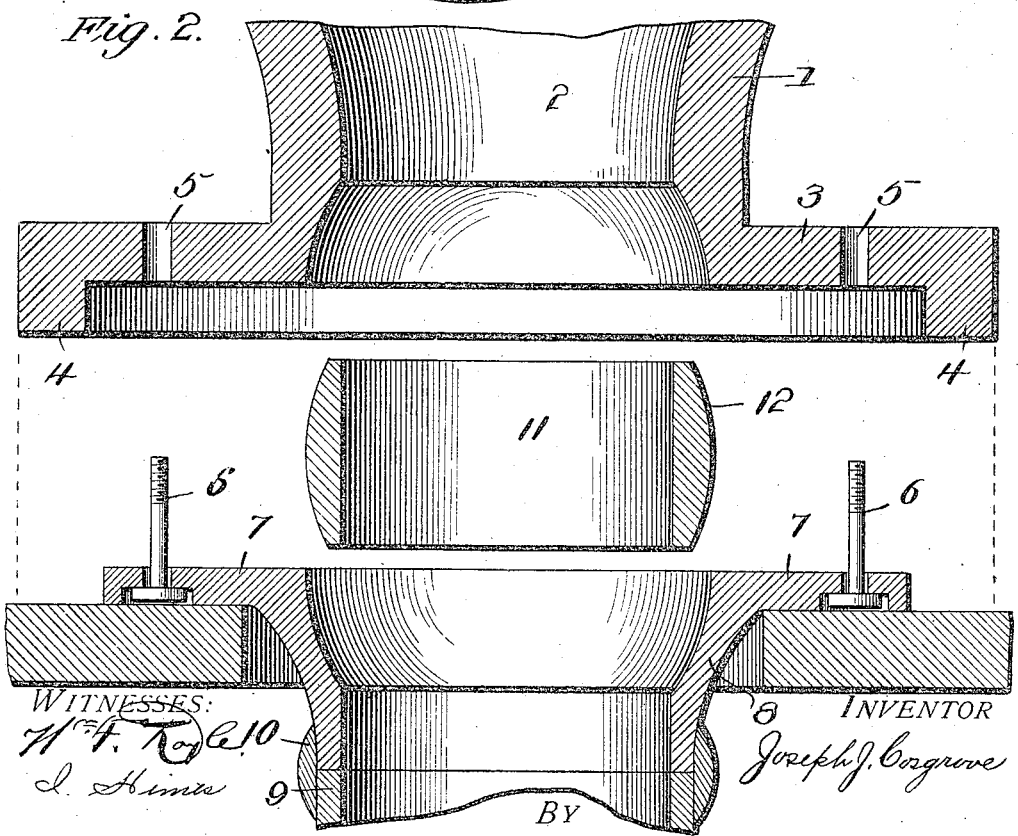

I have illustrated my improvement in the accompanying drawing wherein;

Figure 1, is a vertical sectional view of part of a water closet and part of a soil pipe joined together connected by means of improved connection. Fig. 2, is a similar view with the parts separated.

The lower portion 1, of the water closet is formed with the usual outlet passage 2, and with the laterally extending base 3, having a depending flange 4, at its edges, which flange bears upon the floor of the apartment in which the closet is placed. The base 3, is pierced at 5, 5, for the passage of bolts 6, 6, by means of which the closet is attached to a lateral flange 7, formed on a bell or socket 8, that is carried by the soil pipe 9, connection being effected between the bell or socket, and the soil pipe by means of a wiped joint, 10, the bell or socket being usually made of brass and the soil pipe of lead.

The inner wall of the lower extremity of the outlet passage 2, is cut away on the arc of a sphere described from a point below the extremity of the outlet, and the inner wall of the bell or socket is cut away in the same manner and on the same sphere as the outlet and between the closet and the bell or socket, I place an inner thimble 11, the external surface of which is spherical as shown at 12, conformable to the shape of the cut-away portions of the outlet passage and the bell or socket and with its ends coinciding with small circles of said sphere so that there is, in effect, a ball and socket joint produced which will permit of the closet being connected to the drain pipe whether or not they have their longitudinal axis in alinement or at an angle one to the other. This is a feature of construction which is of great importance as the soil pipe is placed in position during the construction of the building, while the water closet is placed in position after the floor has been laid, and hence it is almost impossible to set the water closet so that the outlet passage and the soil pipe will both have their longitudinal axis in a straight line, one or the other being almost always slightly out of perpendicular. With my improvement it is unnecessary to have the longitudinal axis of the soil pipe or the outlet passage exactly perpendicular, as either or both may be inclined to a considerable degree from the perpendicular without in any manner affecting the fit and tightness of the joint or connection.

The thimble 11, it will be observed, has a metal to metal connection with both the closet and the bell or socket of the soil pipe and hence luting, packing, leading and all other of the usual expedients for effecting an air and water tight joint are rendered unnecessary and are dispensed with in my improvement. The external rounded surface of the thimble and the concave surfaces of the wall of the outlet and of the bell or socket are preferably ground to insure a tight joint and the thimble and bell or socket are preferably made of brass or some other metal or alloy, which is soft as compared to the closet, which is made of cast iron.

I claim:

The combination with a water closet having an integral outlet passage terminating in a spherical socket, of a soil pipe having a spherical seat the surface of which coincides with that of the socket and an interposed thimble having a spherical peripheral surface coinciding with the surfaces of said socket and seat.

In testimony whereof I affix my signature, in presence of two witnesses.

JOSEPH J. COSGROVE.

Witnesses:
 CLYDE B. WEIKERT,
 THOS. A. CONNOLLY.